Jan. 19, 1965  R. E. WISEBAKER  3,165,766
TRANSFER FOR METAL FORMING MACHINE
Filed Aug. 29, 1961  14 Sheets-Sheet 1
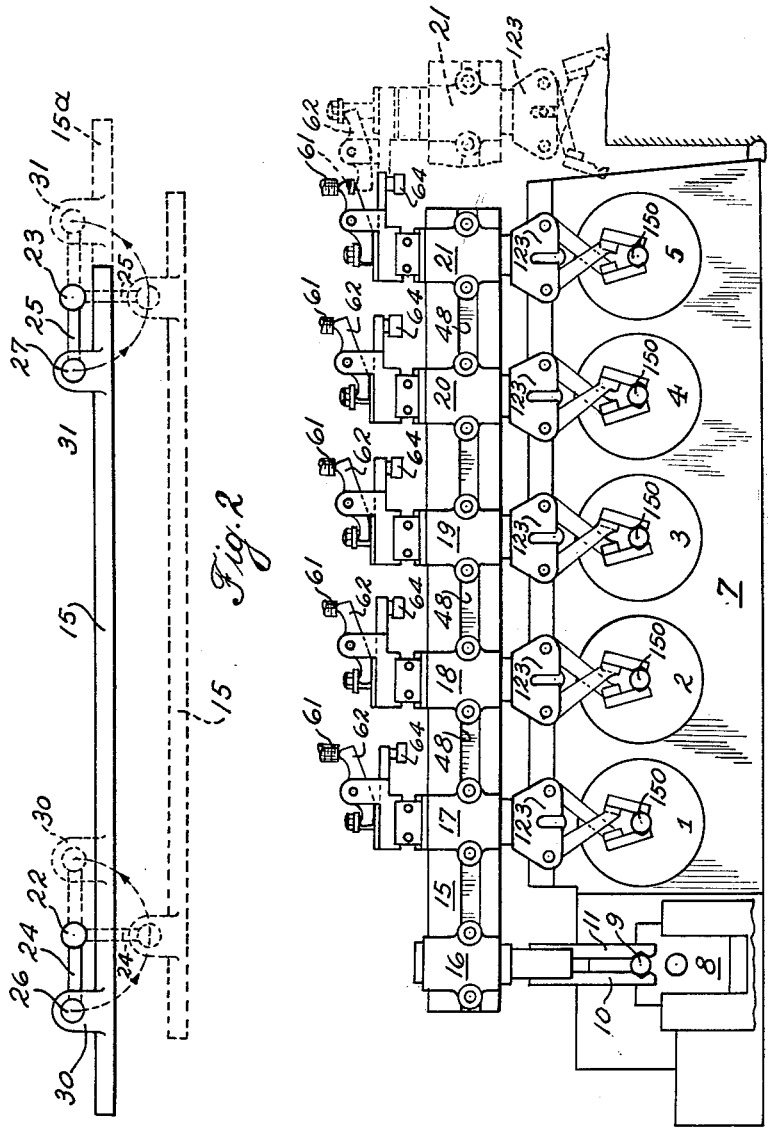
INVENTOR.
ROBERT E. WISEBAKER
BY
RICHEY, McNENNY & FARRINGTON
Donald W. Farrington
ATTORNEYS

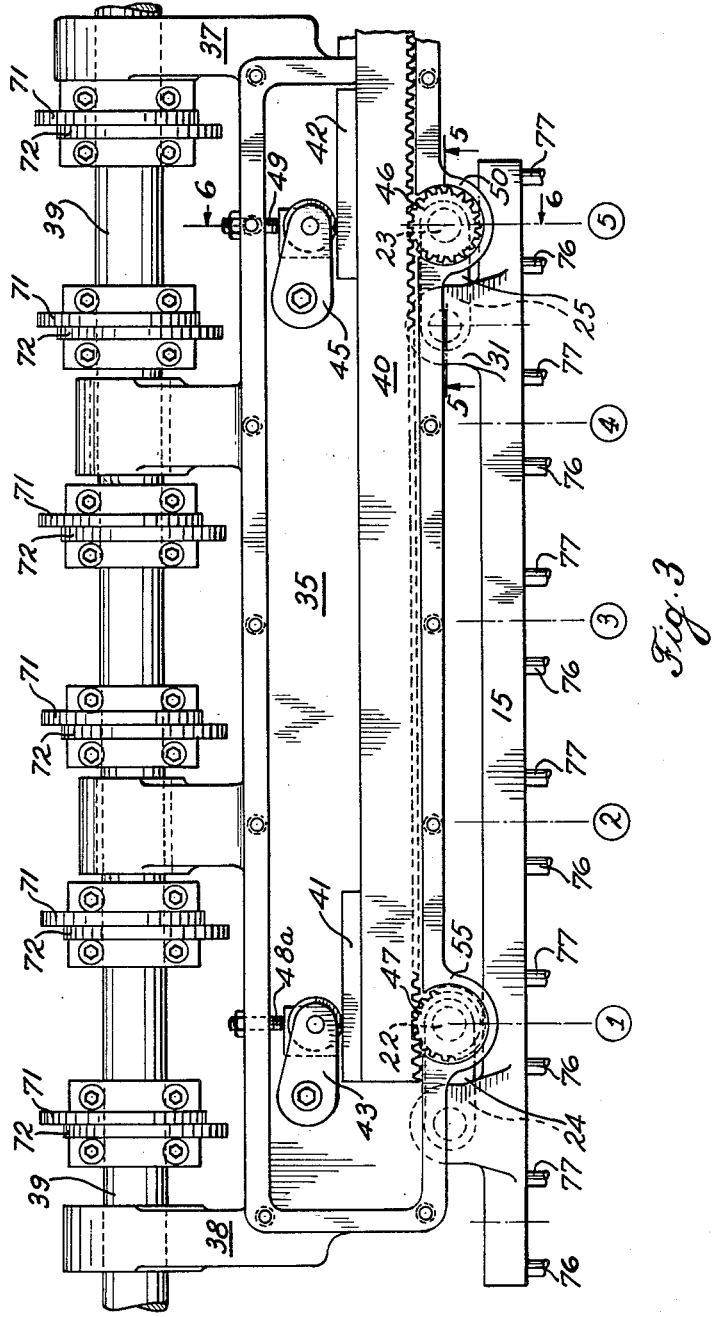

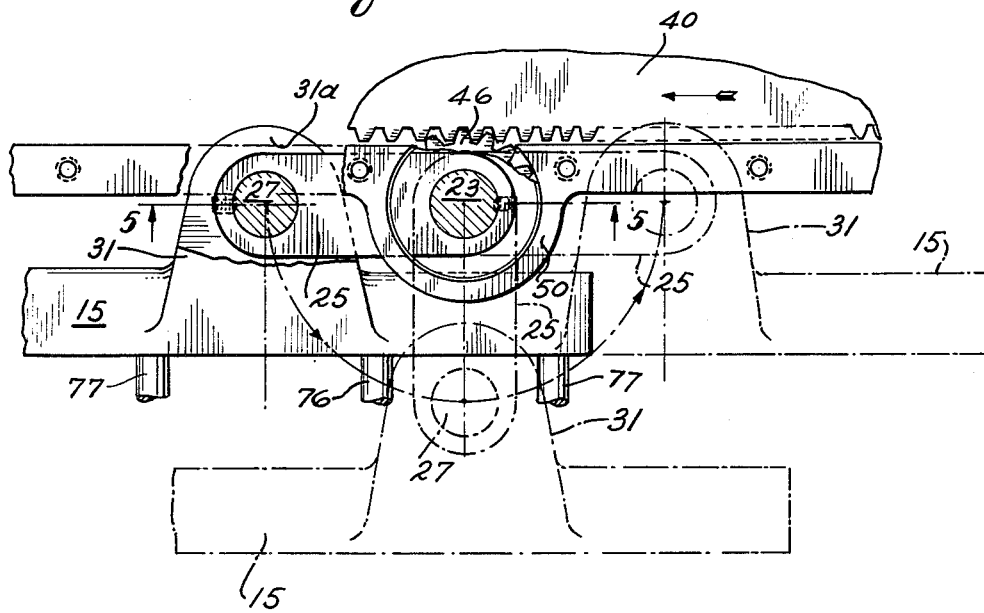
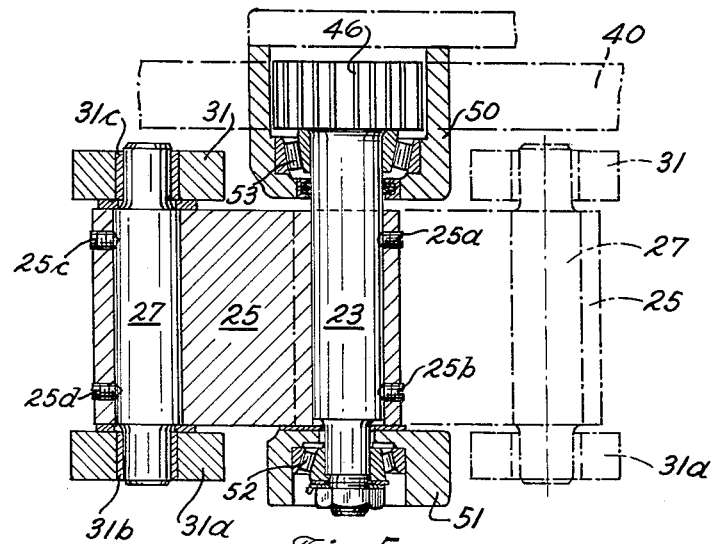

Jan. 19, 1965 R. E. WISEBAKER 3,165,766
TRANSFER FOR METAL FORMING MACHINE
Filed Aug. 29, 1961 14 Sheets-Sheet 4
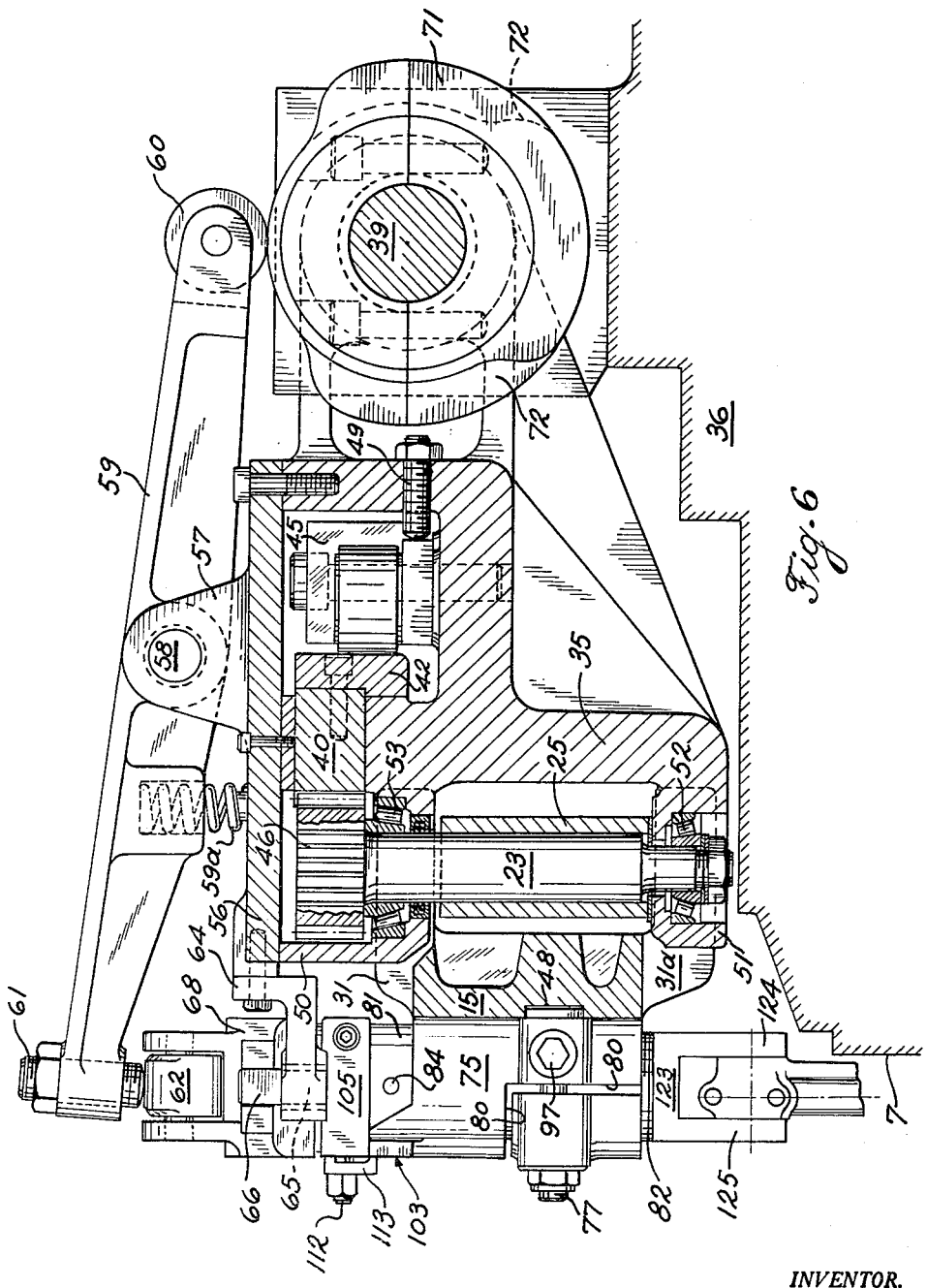
INVENTOR.
ROBERT E. WISEBAKER
BY
RICHEY, McNENNY & FARRINGTON
ATTORNEYS

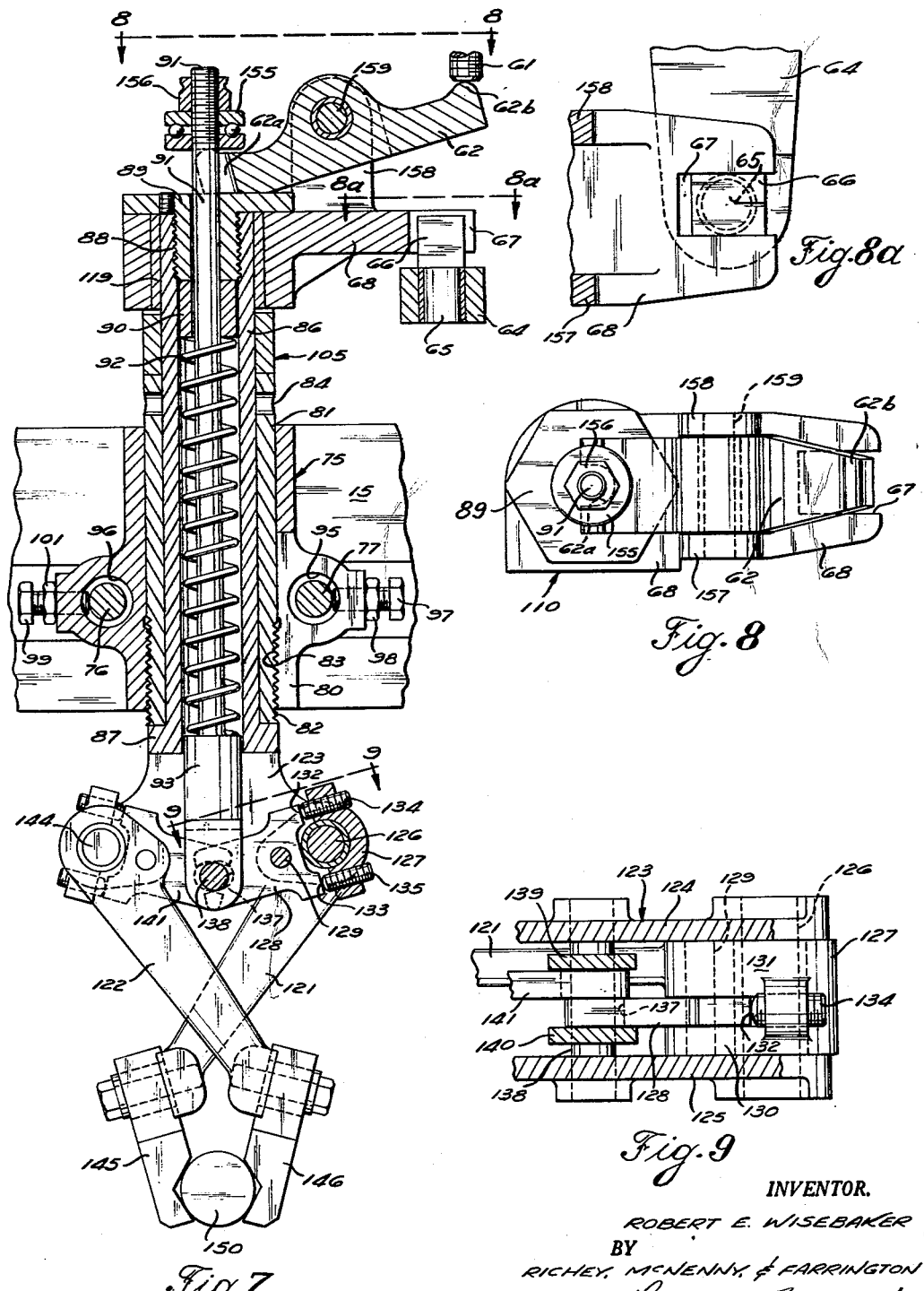

Jan. 19, 1965  R. E. WISEBAKER  3,165,766
TRANSFER FOR METAL FORMING MACHINE
Filed Aug. 29, 1961  14 Sheets-Sheet 6

INVENTOR.
ROBERT E. WISEBAKER
BY
RICHEY, McNENNY & FARRINGTON
Donald W. Farrington
ATTORNEYS

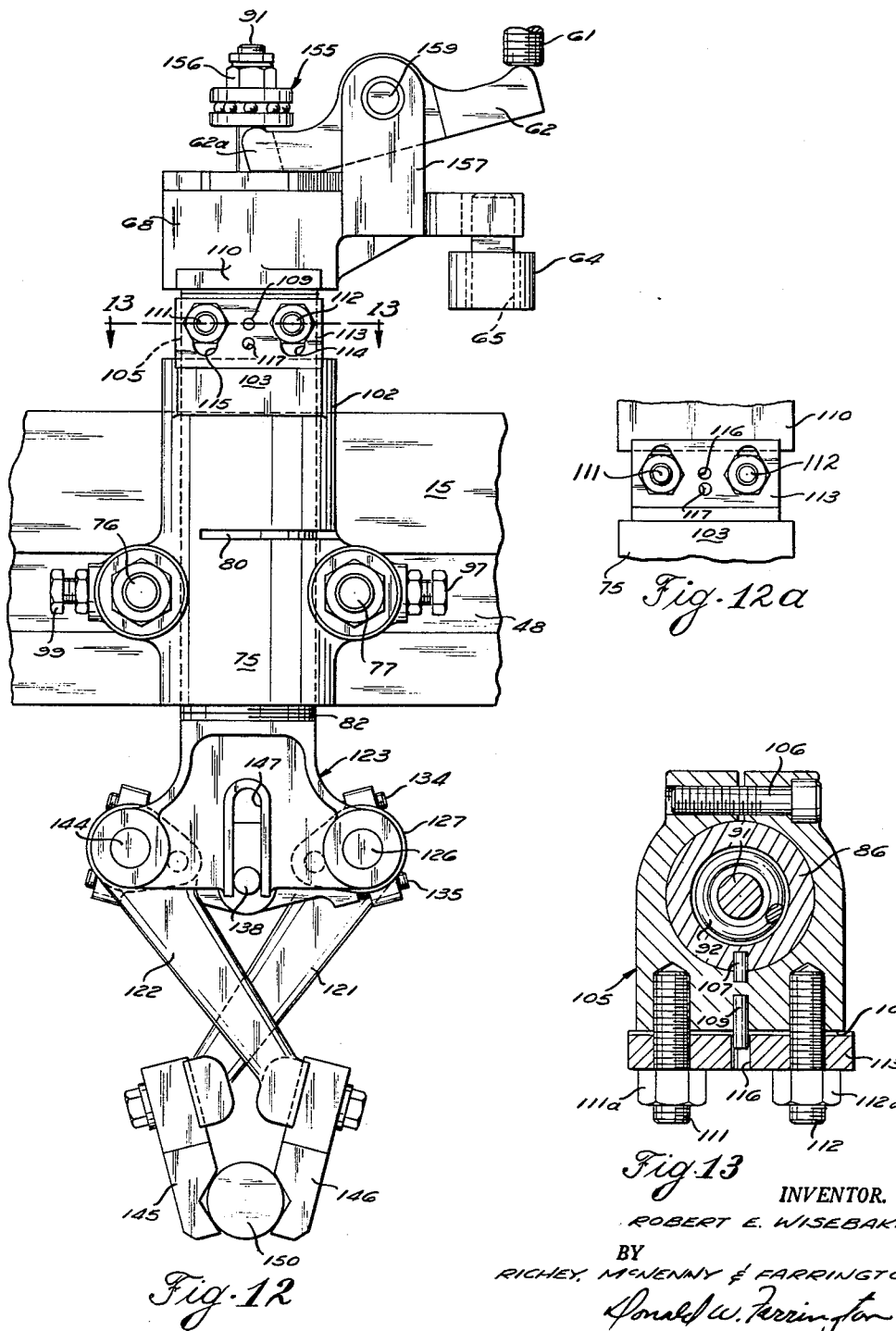

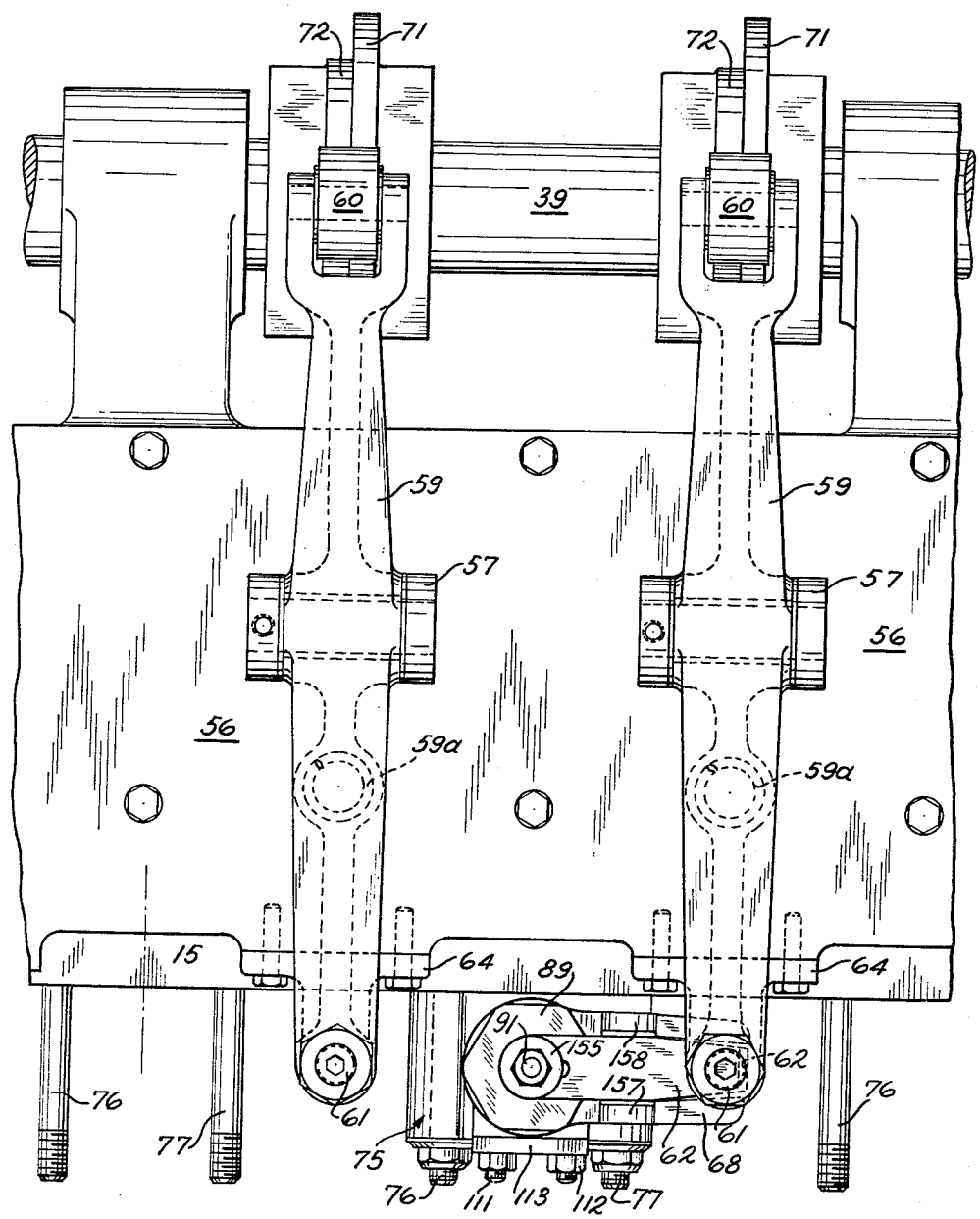

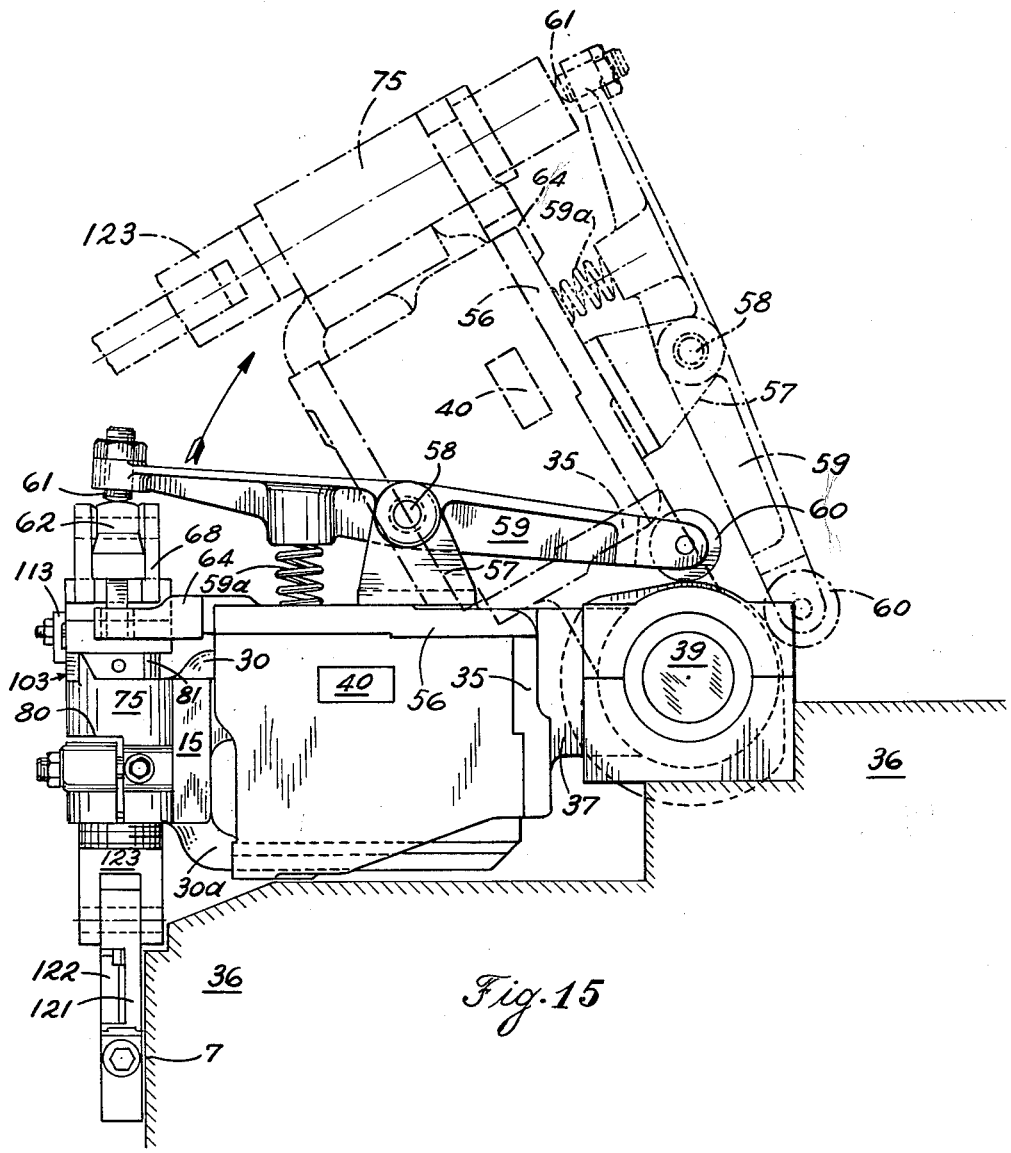

Jan. 19, 1965   R. E. WISEBAKER   3,165,766
TRANSFER FOR METAL FORMING MACHINE
Filed Aug. 29, 1961   14 Sheets-Sheet 10
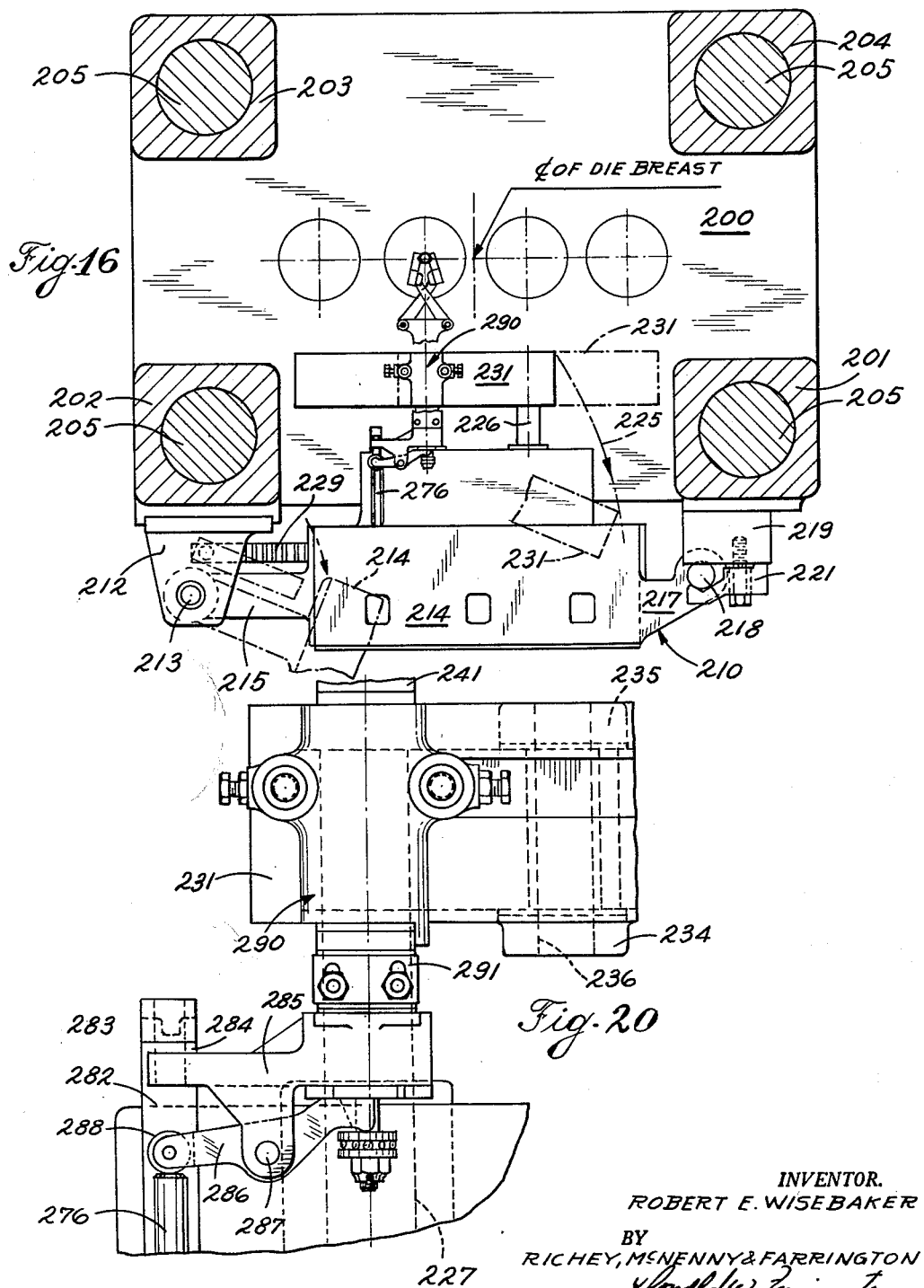
INVENTOR.
ROBERT E. WISEBAKER
BY
RICHEY, McNENNY & FARRINGTON
ATTORNEYS

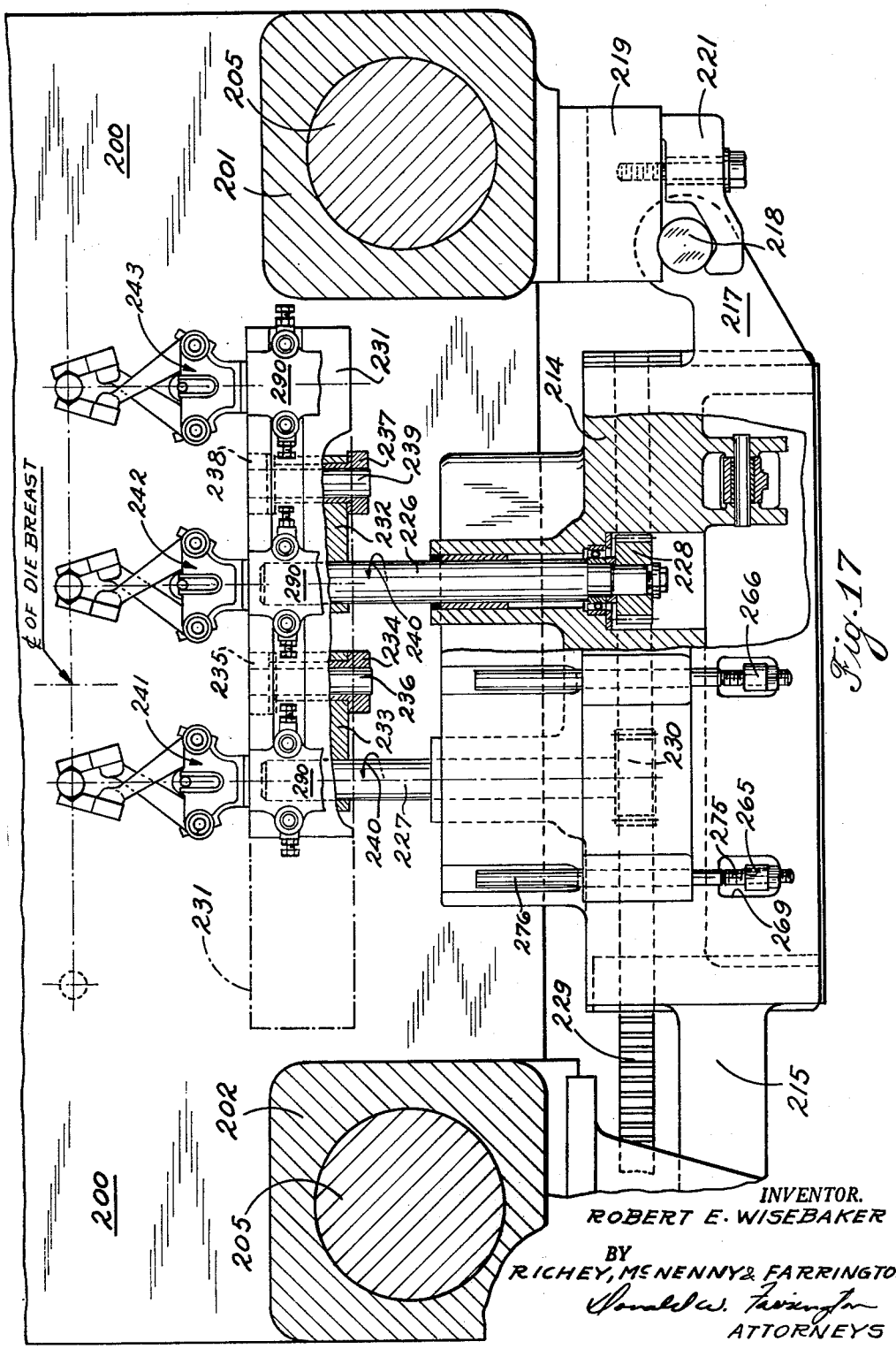

Jan. 19, 1965   R. E. WISEBAKER   3,165,766
TRANSFER FOR METAL FORMING MACHINE
Filed Aug. 29, 1961   14 Sheets-Sheet 12
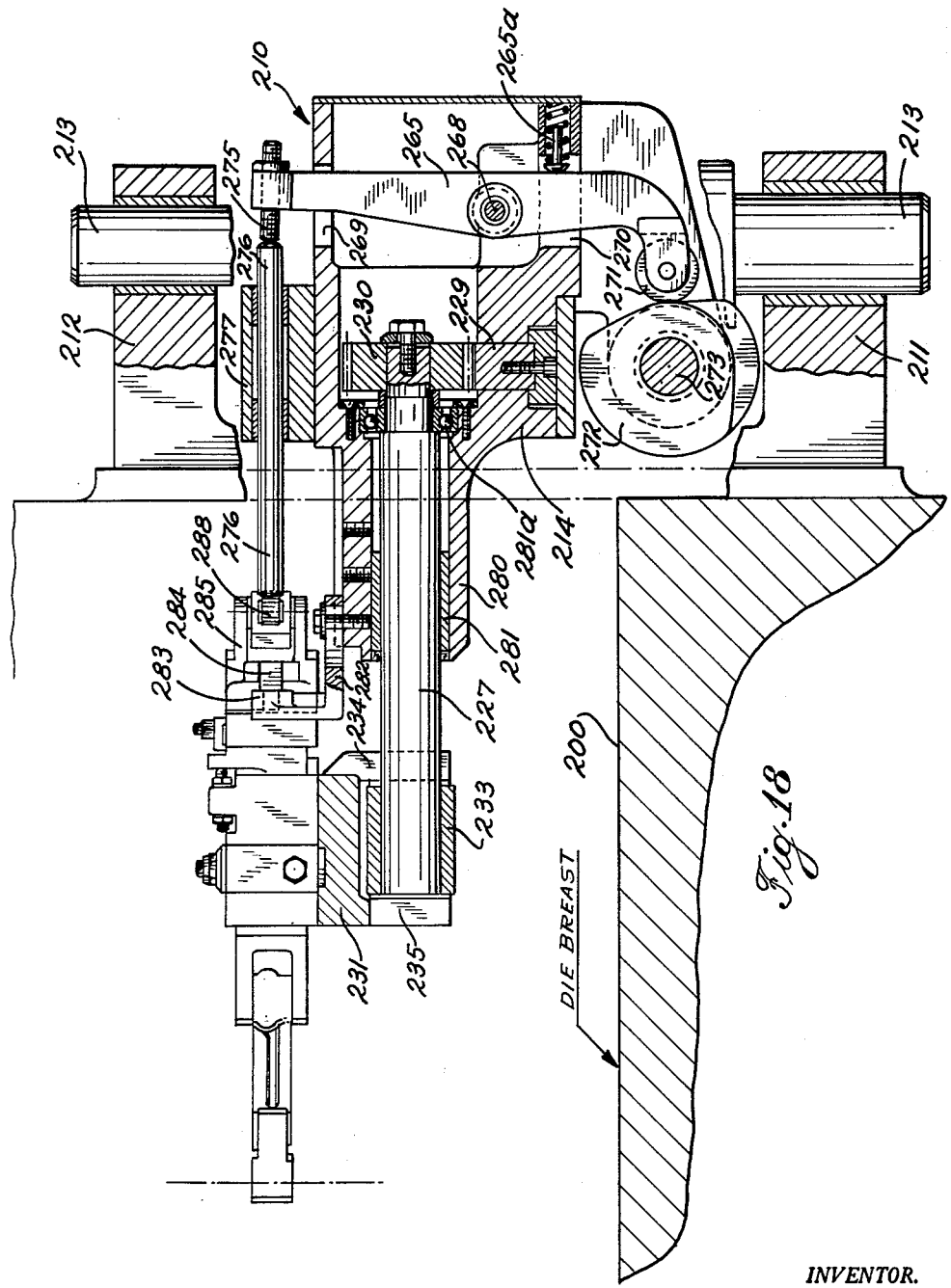
INVENTOR.
ROBERT E. WISEBAKER
BY
RICHEY, MCNENNY & FARRINGTON
ATTORNEYS Jan. 19, 1965    R. E. WISEBAKER    3,165,766
TRANSFER FOR METAL FORMING MACHINE
Filed Aug. 29, 1961    14 Sheets-Sheet 13

INVENTOR.
ROBERT E. WISEBAKER
BY
RICHEY, McNENNY & FARRINGTON
ATTORNEYS

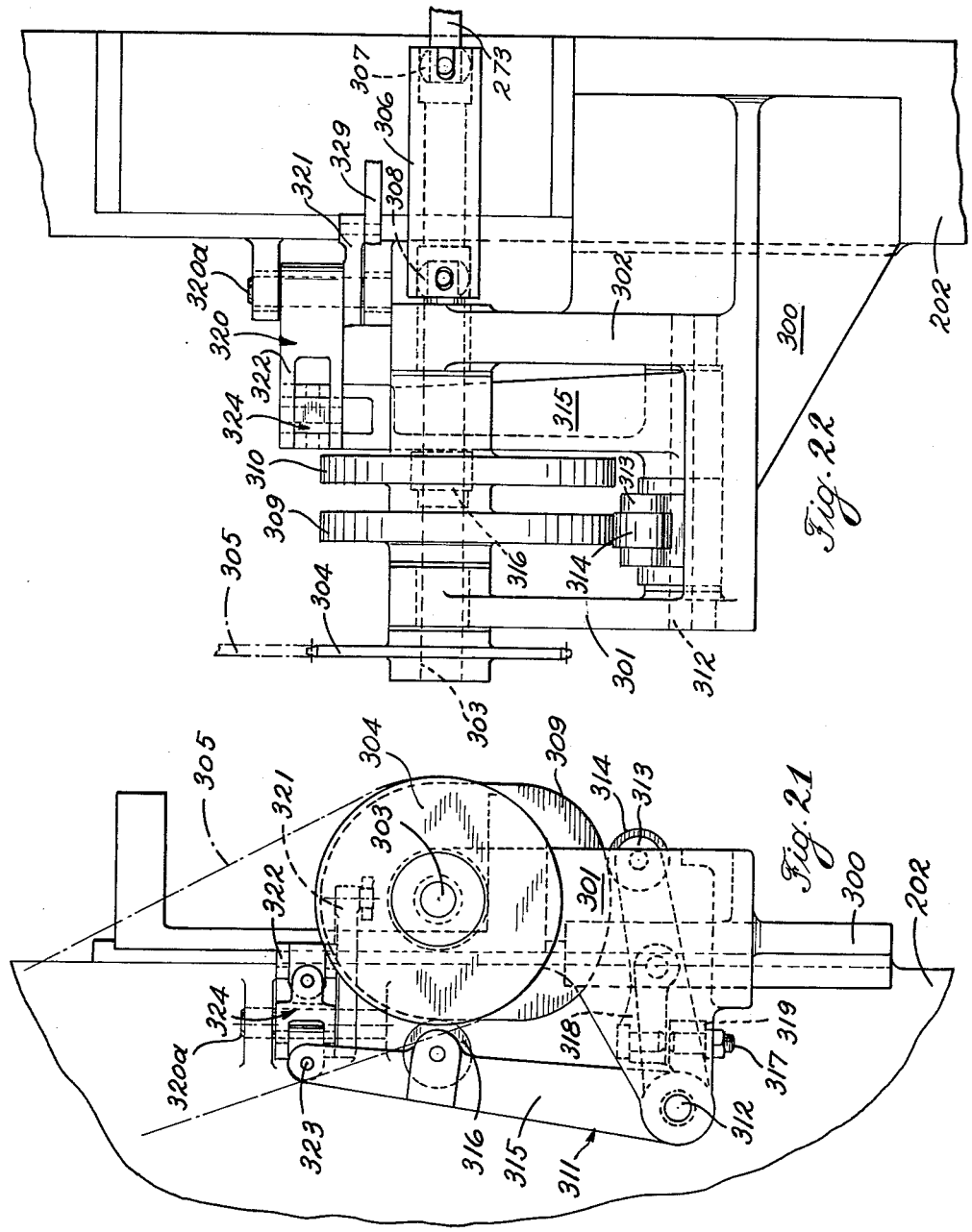

United States Patent Office 3,165,766
Patented Jan. 19, 1965

3,165,766
TRANSFER FOR METAL FORMING MACHINE
Robert E. Wisebaker, Tiffin, Ohio, assignor to The National Machinery Company, Tiffin, Ohio, a corporation of Ohio
Filed Aug. 29, 1961, Ser. No. 134,659
18 Claims. (Cl. 10—76)

This invention relates to transfer apparatus for metal forming machines and more particularly to a transfer for a metal forming machine wherein a blank is worked in sequence in a plurality of dies arranged across a die breast and wherein the blank being worked is turned end for end between the die stations.

It is among the objects of my invention to provide a transfer for moving blanks to be worked in a series of dies arranged along the face of a die breast, and wherein each transfer assembly is constructed and arranged so that it may be easily and quickly adjusted for different modes of operation. For example, the transfer may be adjusted so that blanks may be transferred from one station to the next without turning the blank end for end between the stations or, alternatively, the transfer may be adjusted so that the blank will be turned end for end during the transfer motion and, at the same time, the pairs of fingers for each assembly may be opened and/or closed during any phase of the transferring movement.

It is also among the objects of my invention to provide a transfer for die stations horizontally spaced along a die breast wherein a plurality of pairs of transfer fingers are mounted on a transfer bar parallel to the die breast and the bar is arranged to move through an arc of 180° and, at the same time, the bar is maintained parallel to the die breast during such movement, and wherein the horizontal distance between the ends of the arc corresponds to the distance between die stations so that blanks carried in each pair of transfer fingers are advanced to the next adjacent die station by the movement of the transfer bar.

It is a further object of my invention to provide a transfer according to the preceding object wherein each pair of transfer fingers is mounted on a carrier journalled upon an axis parallel to the die breast and wherein an arm projecting from the carrier engages means fixed with respect to the die breast to turn the transfer fingers 180° during the arcuate movement of the transfer bar whereby the blank carried by each pair of fingers is turned end for end relative to the die breast.

It is a further object of my invention to provide a transfer according to the preceding objects wherein the transfer fingers of each cooperating pair are spring-biased toward closed position and wherein the transfer fingers of each pair may be moved to open or closed position at any point along the path of travel of the transfer fingers from one die station to the next adjacent die station.

It is a further object of my invention to provide a transfer for a metal forming machine having a heading slide wherein the transfer assembly includes a housing pivoted on the bed frame and wherein a rack is reciprocated within the housing, and wherein the rack engages pinions effective to swing the transfer bar through 180°, and wherein the pivotal axis of the housing is coincident with the axis of a cam shaft rotated in timed relation with the header slide and the rack whereby the transfer fingers may be opened and closed in response to rotation of the cam shaft and the attendant movement of cam followers and levers connecting the cam shaft and the transfer fingers.

It is also among the objects of the invention to provide a transfer for metal forming machines having a vertical die breast and a horizontal reciprocating header slide and for metal forming presses having a horizontally disposed die breast and a vertically reciprocating ram.

It is a further object of the invention to provide a transfer apparatus for a press having a horizontal die box carrying a plurality of dies and a vertically reciprocating ram carrying tools for shaping articles in the dies, and wherein the transfer mechanism is pivotally mounted on the press to swing about a vertical axis to a position over the dies and to a position extending outwardly away from the press to facilitate servicing the dies and transfer mechanism.

Further objects and advantages relating to accuracy in the control of transfer motion and in the opening and closing of transfer fingers and in the accessibility of parts for service and in the efficiency in operation and ruggedness of construction will appear from the following description and the appended drawings wherein:

FIG. 1 is an elevation showing the transfer apparatus according to my invention as mounted on the vertical die breast of a metal forming machine;

FIG. 2 is a plan view diagrammatically showing the movement of the transfer bar where each port of the bar moves through an arc of 180° while the bar remains parallel to the die breast;

FIG. 3 is a plan view showing the transfer bar, the rack for operating the pinions for moving the transfer bar and the cam shaft for controlling the opening and closing of the transfer fingers;

FIG. 4 is a plan view with parts in section and with parts broken away showing the pinion and linkage arrangement for moving the transfer bar;

FIG. 5 is an elevation with parts in section taken along the plane indicated at 5—5 of FIG. 4;

FIG. 6 is an elevation with parts in section showing the transfer housing as mounted on the cam shaft and the means for supporting the transfer bar on the housing;

FIG. 7 is an elevation with parts in section taken through the transfer finger apparatus as mounted on the transfer bar;

FIG. 8 is a plan view showing the opening lever for the transfer fingers as indicated at 8—8 of FIG. 7;

FIG. 8a is a plan view in enlarged detail showing the operative connection between the transfer finger assembly and means carried by the bed frame to effect rotation of the transfer fingers;

FIG. 9 is a sectional view taken as indicated in the plane 9—9 of FIG. 7;

FIG. 12 is a front elevation of a transfer finger assembly with the parts arranged so as to prevent the turning of a blank end for end during the transfer motion from one die station to the next;

FIG. 12a is an elevation with parts broken away showing the assembly of FIG. 12 with the parts adjusted so as to turn the blank end for end as it is being transferred from one station to the next;

FIG. 13 is a sectional view taken as indicated at 13—13 of FIG. 12;

FIG. 14 is a plan view showing the cam follower and lever arrangement for opening and closing the transfer fingers in response to movement of the cam shaft;

FIG. 15 is a side elevation of the transfer unit as mounted on the bed frame and journalled on the cam shaft and showing the transfer unit swung upwardly away from the die breast to facilitate service of the dies and adjustment of the transfer;

FIG. 16 is a plan view with parts in section showing a transfer according to the present invention mounted on a press;

FIG. 17 is a plan view with parts in section showing the transfer mechanism mounted to transfer blanks between die stations in a press;

FIG. 18 is a sectional elevation of the press transfer;

FIG. 20 is an enlarged detailed showing of the blank finger operating mechanism on the press transfer;

FIG. 21 is a side elevation showing the transfer drive apparatus as used on a press; and FIG. 22 is a front elevation of the driving mechanism for the transfer.

Figure 10:
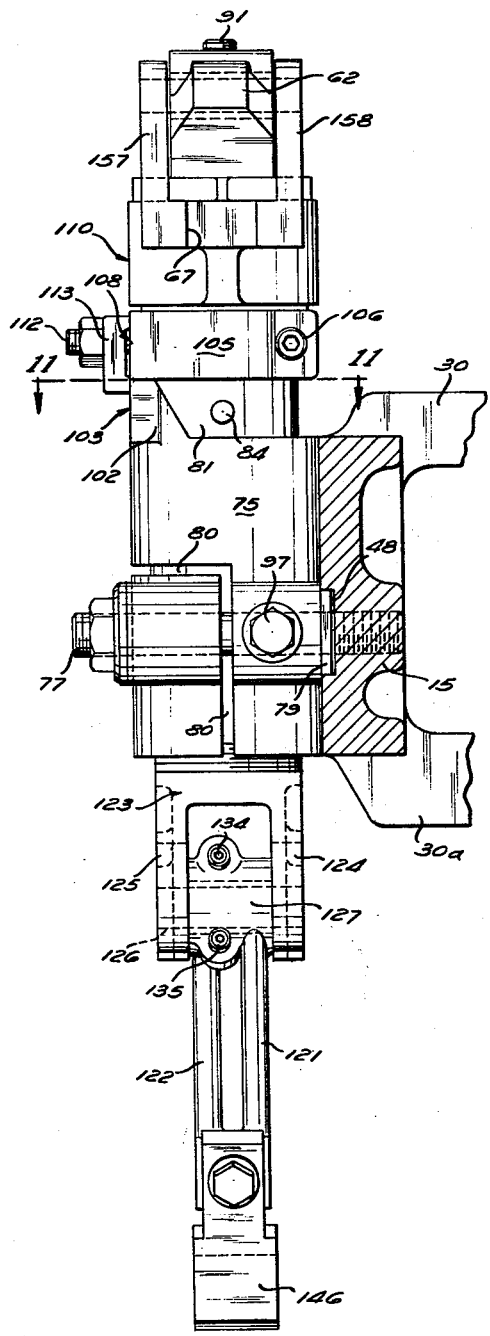
FIG. 10 is an elevation of a transfer assembly with the parts adjusted so as to prevent the turning of a blank end for end as it is being transferred from one die to the other.

The transfer apparatus of the instant invention as disclosed in FIGS. 1 to 15 is used in a header type of metal forming apparatus and in FIGS. 16 to 22 in a press type of metal forming apparatus. In both types of apparatus a transfer bar carrying finger assemblies is oscillated in an arcuate path with respect to the dies in which the blanks are formed and the transfer bar is equipped with a number of pairs of fingers. The finger assemblies carried by the transfer bar are essentially the same for both types of machines and a detailed description of the finger assemblies is included in the description of the embodiment of FIGS. 1 to 15.

The transfer apparatus of the instant invention is illustrated in FIGS. 1 to 15 in the environment of a metal forming machine of the type having a bed frame with a vertically disposed die breast and a series of die stations arranged transversely across the die breast and provided with a header slide equipped with a series of tools aligned with the die stations so that on each reciprocation of the header slide a blank is worked in each of the die stations, and wherein the worked blank is transferred to the next adjacent die station during that phase of the cycle when the header slide is away from the die breast. Such machines are well suited to the forming of nuts, cup-shaped articles, and the like, and transfers for moving such blanks are illustrated in U.S. Patents Nos. 2,689,358 and 2,648,077, owned by the assignee of the instant application. Since the particular article being formed in the machine is not critical to the operation of the instant invention and, since the shape of the header slide tools is not material to the operations of the transfer, the header slide and tools have been omitted.

Referring to FIGS. 1 to 15 of the drawings, the die breast is indicated at 7 and is provided with die stations indicated at 1, 2, 3, 4 and 5 across the die breast. Such metal forming machines are provided with a shear indicated at 8 which is operated in timed relation to the header slide so as to shear off a blank of rod stock and carry the cut length of stock indicated at 9 upwardly into the transfer fingers 10 and 11. It will be understood by those skilled in the art that when the shear 8 retracts to a lower position, a blank, indicated at 9, will remain in the transfer fingers 10 and 11.

The blank 9 is transferred by motion left-to-right to the first die station indicated at 1. After the blank is worked in station 1, it is transferred as blank 150 on the next cycle of the header slide operation to station 2 and this progress of the blank 150 is continued until the finished article moves to the right-hand end of the die breast to the position indicated as "drop-off" position.

A transfer bar indicated at 15 has mounted thereon a plurality of transfer assemblies indicated at 16, 17, 18, 19, 20 and 21. The movement of the transfer bar 15 relative to the die breast is illustrated in FIG. 2 wherein a pinion shaft 22 at the left-hand end of the transfer bar 15 and a pinion shaft 23 at the right-hand end of the bar 15 are provided with links 24 and 25, respectively. The pinion shafts 22 and 23 are arranged to be moved by a rack as described hereinafter in detail so as to swing the links 24 and 25 through an arc of 180°. The shaft 26 at the outer end of the link 24 is journalled in an ear indicated at 30. The shaft 27 carried at the outer end of the link 25 is similarly journalled in the ear 31 integrally formed with the transfer bar 15.

The links 24 and 25 are illustrated in three different positions by means of phantom outline in FIG. 2. The motion of the links 24 and 25 causes the transfer bar 15 to swing from a left-hand position shown in full lines to a right-hand position indicated at 15a. The length of the links 24 and 25 corresponds to half of the distance between each of the die stations 1–5 in the die breast and thus the transfer assemblies 16–21 carried on the transfer bar 15 move to advance each blank to the next adjacent die station upon movement of the transfer bar 15.

A metal forming machine of the type referred to here is preferably equipped with a transfer as disclosed here by the machine manufacturer. As will be understood as this description proceeds, each of the transfer assemblies may be adjusted individually so as to adapt the transfer to the work being handled in the different die stations. Each transfer may be adjusted individually to transfer a blank without inversion or turning the blank end for end and may also be adjusted so as to close or open the fingers which grip the blank at predetermined points along the path of travel from one die station to the next.

The transfer apparatus in its entirety includes a housing 35 mounted on the bed frame 36 by means of ears 37 and 38 projecting rearwardly of the housing and being journalled on the cam shaft 39. The mounting of the housing 35 on the cam shaft 39 provides a structure wherein the entire transfer assembly may be swung upwardly away from the bed frame as illustrated in FIG. 15 in phantom outline. This permits easy access to the dies in the die breast and facilitates the adjustment and service operations on the transfer apparatus.

Within the housing 35 a rack 40 is mounted for reciprocation. The rack 40 is reciprocated by a drive linkage moving in timed relation to the header slide. Movement of the rack to the left, as shown in FIG. 3, results in swinging movement of the transfer bar 15 to the right. Upon return movement of the rack 40 to the right, the transfer bar 15 is restored to the full line position shown in FIG. 3. The rack 40 is provided with bearing plates 41 and 42 and with a roller and follower mechanism 43 and 45 arranged to maintain the rack in engagement with a pinion 46 carried by the pinion shaft 23 and pinion 47 carried by the pinion shaft 22.

A stud adjusting device 48a urges the follower 43 and its roller against the plate 41. Similarly the stud 49 maintains the follower 45 and its roller in the position shown in FIG. 3.

The vertical face of the transfer bar 15 on which the transfer fingers are carried is provided with a groove 48. That side of the transfer bar 15 opposite the face on which the transfer fingers are mounted is provided with two spaced upper ear portions 30 and 31. Complementary lower ear portions are provided on the transfer bar 15 at 30a and 31a.

The transfer housing 35 is provided with a rounded projecting portion 50 which encloses the pinion 46 and a similarly lower projecting portion 51 which carries a bearing 52 to journal the lower end of the pinion shaft 23. The mid-portion of the pinion shafts 22 and 23 are thus outside of the housing, as shown in FIG. 6. An upper shaft bearing 53 is housed within the portion 50 to support the upper end of the pinion shaft 23 adjacent the pinion 46. The left-hand end of the transfer housing is provided with a similarly rounded portion 55 enclosing the left-hand pinion 47.

The link 25 is proportioned as illustrated in FIGS. 5 and 6 so as to surround that portion of the pinion shaft 23 located between the housing portions 50 and 51. The link 25 is fixed to the shaft 23 by means of set screws 25a and 25b so as to cause the link 25 to swing with the pinion shaft 23. It will be understood that the links 24 and 25 may be clamped or keyed to the pinion shafts. The outer free end of the link 25 is secured to the shaft 27 by means of set screws 25c and 25d.

The upper and lower ears 31 and 31a, respectively, on the transfer bar 15 are each provided with bushings as at 31b and 31c to permit the shaft 27 to rotate therein when the link is swung through its arcuate movement.

The transfer housing 35 is provided with a cover plate 56 and formed integrally with the upper surface of the cover plate are spaced ears 57 ot provide a journal 58 for the rocker arm 59. One end of the rocker arm is provided with a cam follower as at 60 and the other end of the rocker arm is provided with an adjustably mounted stud 61 which overhangs the end of a lever 62 carried by the transfer finger assembly.

As will be observed from FIG. 14, the rocker arms 59 extending over the transfer mechanism are located midway between the die stations. The lever 62 carried by the transfer finger assembly is proportioned to extend laterally from the central axis of the assembly half of the distance between the adjacent die stations. As a result of this proportioning the outer free end of the lever 62 which bears against the underside of the rocker arm 61 remains beneath the member 61 throughout the parallel linkage transfer motion of the transfer bar 15.

Referring again to FIG. 6, the cover 56 is provided with a bracket 64 which supports at its outer end a pin 65. The pin 65 is journalled in the bracket 64 and is provided with a square portion 66 (see FIGS. 7 and 8a) which square portion 66 is embraced by the slot 67 formed in the end of bracket 68 carried by the transfer finger assembly. The axis of the pin 65 carried by the bracket 64 is located midway between adjacent die stations and is located beneath the stud 61 carried by the rocker arm 59. When the transfer bar 15 is swung through its arc from its left-hand position to its right-hand position, as illustrated in FIG. 2, the pin 65 serves as a fulcrum and causes the transfer finger assembly to be rotated about its vertical axis 180° during the horizontal travel of the transfer bar 15.

The roller 60 on the rocker arm 59 is biased by spring 59a against the cams 71 and 72 fixed to the cam shaft 39. As shown in FIG. 14, the axial dimension of the roller 60 is such that it overlaps both of the cams 71 and 72 carried by the cam shaft 39. The roller 60 is shown as following the low portion of the cams 71 and 72 in FIG. 6. Upon rotation of the cam shaft 39, however, high portions of the cams 71 and 72 will be effective to rock the rocker arm 59 against the bias of the spring 59a and thus depress the stud 61 engaging the outer free end of the rocker arm 62 carried on the transfer finger assembly.

Figure 11:
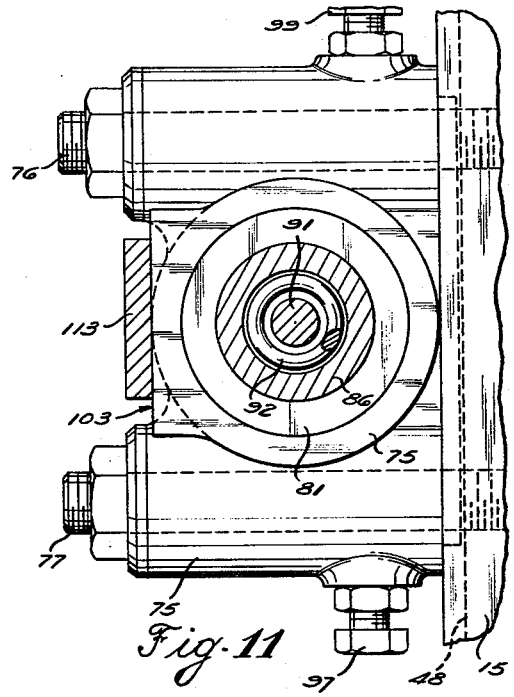
FIG. 11 is a sectional view taken as indicated at 11—11 of FIG. 10.

Each of the several transfer assemblies mounted on the bar 15 includes a housing 75 anchored to the transfer bar 15 by means of spaced studs 76 and 77. The transfer bar 15 is interiorly threaded as indicated in FIGS. 10 and 11 at the bottom of the groove 48 in the bar 15. The housing 75 is provided with an integrally formed transverse lug 79 which fits snugly in the groove 48 and prevents movement of the housing 75 relative to the bar when the nuts are drawn up on the studs 76 and 77. The housing 75 is preferably provided with an L-shaped slot 80 so that when the nuts on the studs 76 and 77 are drawn up, the housing 75 clamps the tube 81 carried thereby.

The tube 81 is preferably of a bronze bearing material and is threaded at its lower end at 82 so as to be received within the threaded portion 83 on the housing 75. The upper end of the bearing tube 81 is provided with a series of spaced openings 84 adapted to receive pins, or the like, so as to turn the bearing tube 81 on its threaded connection 82–83 and thus adjust the tube 81 vertically within the housing 75.

The inner bore of the tube 81 provides a journal or pivot bearing for the tubular member 86 arranged therein. The lower end of the member 86 is provided with a flange 87 bearing against the lower end of the bearing tube 81 and the upper interior bore of the tube 86 is threaded as at 88 to receive the threads on the shank of member 89.

The end of the threaded portion on the member 89 serves as an abutment for the ring 90 which surrounds the operating rod 91 carried by the transfer assembly. A spring 92 surrounds the rod 91 and one end of the spring 92 bears against the abutment ring 90 and the other end of the spring bears against a shoulder 93 integrally formed at the lower end of the rod 91. The rod 91 in its entirety is mounted for vertical reciprocation within the transfer assembly and is guided in such reciprocation by the member 93 at the lower end bearing on the interior of the tube 86 and the upper end of the rod 91 being guided in the ring 90 and the bore in the member 89.

The transfer assembly housing 75 may be adjusted horizontally within the limits provided by the enlarged bores 95 and 96 which surround the studs 77 and 76, respectively. Adjustable cap screws 97 are threaded through the wall of the housing 75 so that the inner end of the cap screw 97 may bear against the stud 77. A lock nut 98 holds the cap screw 97 when the proper horizontal adjustment has been made. A similar adjusting arrangement is provided on the left-hand side of the housing 75 by means of the cap screw 99 and the lock nut 101. It will be understood that the horizontal adjustment of the housing 75 is effective so as to bring the center line of the space between the transfer arms 121 and 122 into alignment with the center line of the die in the die breast at each end of the transfer motion.

To adjust the transfer arms 121 and 122 so that the blank is turned end for end during transfer motion or, alternatively, is transferred without inversion, the assembly is constructed and arranged to include a shiftable locking member which may be shifted downwardly to prevent inversion of the blank or shifted upwardly to effect inversion of the blank. When the locking member is shifted downwardly, the transfer arms 121 and 122 are, in effect, clamped against rotation and locked to the transfer assembly housing. When the locking bar is shifted upwardly, the transfer arms 121 and 122 are, in effect, clamped to a member which is driven rotatably during each transfer motion.

The assembly housing 75 is formed to provide at its upper edge a portion 102 having a flat face 103. A clamping member indicated in its entirety as at 105 is secured to the tube 86 by means of the clamping screw 106 and the key 107 which locks the member 105 to the tube 86. The clamping member 105 is provided with a flat face 108 and a pin 109 carried by the member 105 projects from the flat face 108. The member 68 mounted above the tube 86 immediately above the clamp 105 is also provided with a flat face indicated at 110.

A pair of studs 111 and 112 project from the flat face 108 of the clamping member 105. A locking bar 113 is slotted as at 114 and 115 to receive the studs 111 and 112 projecting from the clamping member 105. The locking bar 113 is provided with a top aperture 116 and with a lower aperture 117. As shown in FIGS. 10 and 12, the locking bar 113 is in its lowermost position and the lower edge thereof overhangs the flat face 103 on the housing 75. In this lowered position the nuts 111a and 112a may be drawn up on the studs 111 and 112 and thus the clamping member 105 is locked to the housing 75 and is restrained against rotation. By reason of the key 107 such restraint is transmitted to the tube 86 with the result that the transfer assembly carried in the housing 75 carries the blank to be worked from one die to the next adjacent die without turning the blank end for end during the transfer movement. This is also known in the art as a "straight across" transfer and is utilized whenever it is unnecessary or undesirable to turn the blank end for end between die stations.

It will be observed that with the locking member 113 in its lowered position, the upper edge of the locking bar 113 is free of the flat surface 110 on the member 68. Accordingly, the member 68 turns idly on its bushing 119 during transfer motion.

Figure 10A:
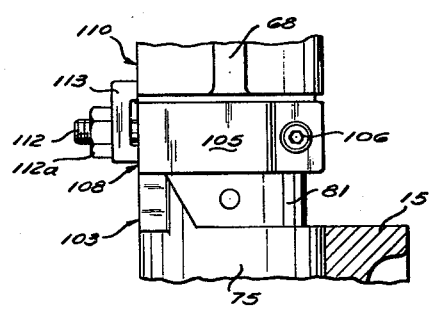
FIG. 10a is an elevation showing the assembly of FIG. 10 adjusted to rotate the blank during transfer from one die station to the next.
Figure 19:
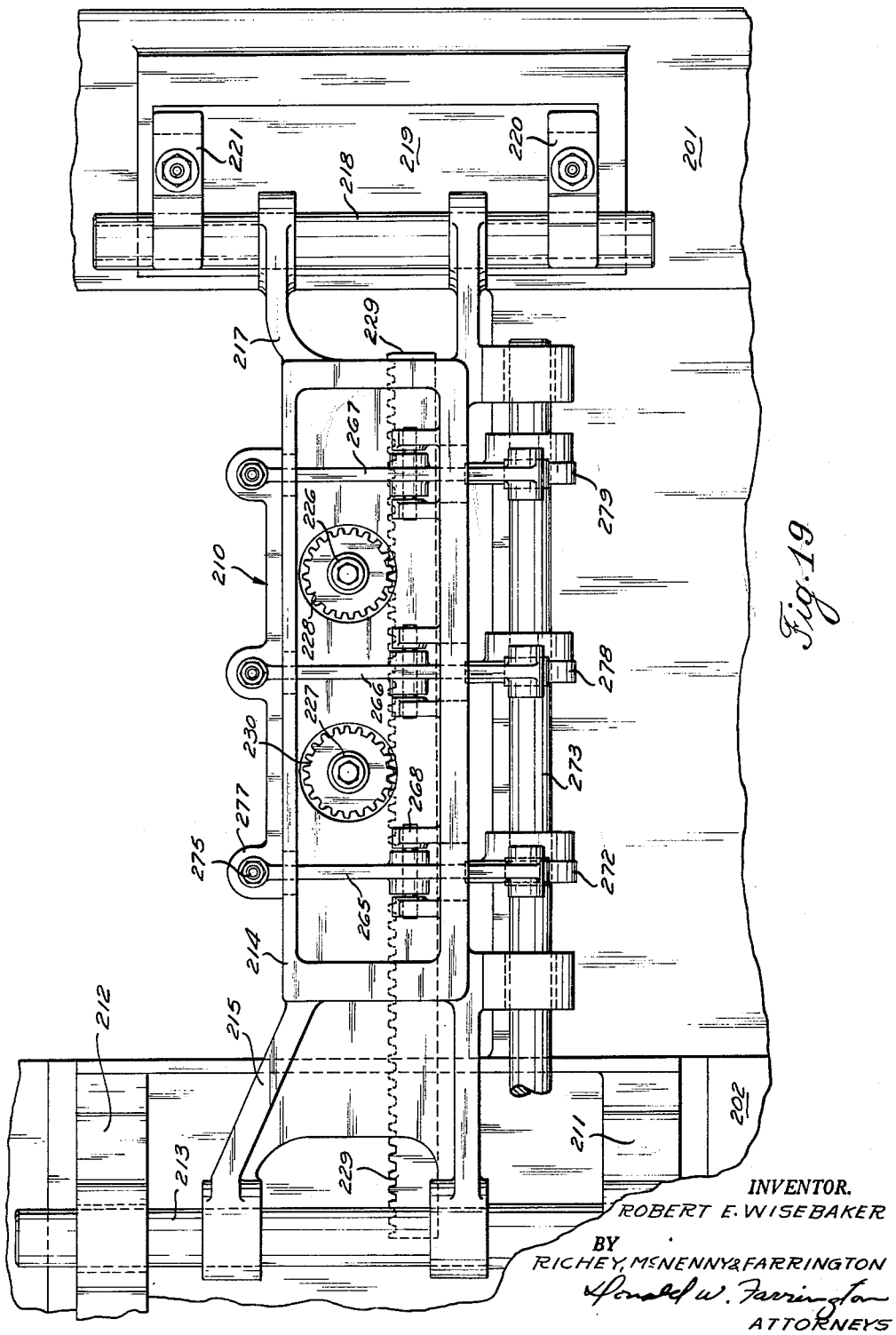
FIG. 19 is a front elevation of the press transfer.

In FIGS. 10A and 12A the locking bar 113 is shown as mounted in its uppermost position with the aperture 117 located on the pin 109. With the nuts 11a and 12a drawn up on the studs 111 and 112 and the clamping bar in its uppermost position, the upper edge of the member 113 overhangs the flat surface 10 of the member 68. This repositioning of the member 113 frees the locking bar with respect to the flat surface 103 on the housing 75.

In the last-described position the clamping member 105 and the tube 86 to which it is secured are constrained to rotate with the member 68. Accordingly, as the transfer bar 15 oscillates through 180°, the member 68 turns about the axis of the pin 65 through 180° with the result that the blank carried in the transfer fingers is turned end for end as the blank is moved from one die to the next adjacent die in the die breast.

The transfer arms 121 and 122 are carried by a yoke member 123 integrally formed with the tube 86. Each side of the yoke member 123 is provided with depending ear portions 124 and 125 which provide spaced journals for the pin 126.

The pivoted end of the transfer arm 121 is provided with an integrally formed boss 127 which is shaped as shown in FIG. 9. The boss 127 is pivoted on the yoke 123 at 126. A crank arm 128 is pivoted as at 129 on spaced boss portions 130 and 131. The member 128 is provided with lugs 132 and 133 at each side of the pivot 129 so as to engage the inner ends of set screws 134 and 135, respectively, carried in the boss 127. The other end of the member 128 is notched as at 137 to embrace a transverse pin 138 carried at the lower end of the vertical rod 91. It will be noted that the lower portion of the rod 91 is provided with spaced ears 139 and 140 so that the member 128 at the right-hand side and the member 141 at the left-hand side is disposed between the ears 139 and 140.

The left-hand assembly for the transfer arm 122 is similarly mounted on a pin 144 carried at the left-hand side of the yoke member 123. The spring 92 which surrounds the rod 91 normally biases the rod 91 downwardly and thus the transfer arms 121 and 122 are biased toward each other so as to grip the blank 150 between transfer grips 145 and 146 on the transfer arms.

As shown in FIG. 12, the opposite sides of the yoke 123 are slotted as indicated at 147 so that the pin 138 carried by the rod 91 is guided vertically during the pivotal movement of the transfer fingers. Accurate adjustment of the transfer arms with respect to each other about the pins 126 and 144 is effected by means of the set screws 134 and 135. By loosening one set screw and drawing up on the other set screw (134-135), the effective angle between the arms of the bell crank thus formed may be changed. A wide variation in shape of the article being formed and gripped between the transfer arms may be thus accommodated.

To open and close the transfer arms, the forked end portion 62a of the lever 62 embraces the upper end of the rod 91 beneath the anti-friction bearing 155. The location of the bearing 155 axially on the rod 91 is determined by the adjusting nut 156 at the upper side of the anti-friction bearing.

The member 68 is provided with spaced ears 157 and 158 to provide a support for pivot pin 159 on which the lever 62 is pivoted. The spring 92 normally biases the lever 62 to the position shown in FIGS. 7, 10 and 12 and when the member 61 is depressed, the rod 91 is raised and the transfer arms 121 and 122 move relative to each other so as to release a blank 150 held therebetween.

The rounded portion 62b on the lever 62 is located at a point midway between two adjacent die stations and, since the end of the member 68 thereneath is constrained to remain at the center of an arc corresponding to the arcuate movement of the transfer assembly, the member 61 may be raised and lowered at any time during the transfer motion and thus the transfer arms may be opened and/or closed at any time during the transfer motion. Usually the opening and closing occurs at the end of the transfer motion.

The cams 71 and 72 being independently adjustable relative to the cam shaft 39, the rocking motion of the cam lever 59 may be effected at any time in the cycle of the machine operation. For example, the cam 71 and 72 may be adjusted so as to permit the fingers to move to a closed position in timed relation to the movement of the knock-out which ejects a blank from one of the die stations into the waiting transfer grips. Similarly the transfer arms may be actuated by cam adjustment so as to release an article from the transfer grips as the header slide advances and starts to move said article into a die in the die breast.

In the transfer illustrated in FIG. 1, assemblies 17 to 21 represent the construction described in detail in connection with FIGS. 7 to 13 and are accordingly universal in their application in that the locking bar 113 may be moved to either its upper or lower position and thus bring about a turn-about transfer between any selected die stations. The change from turn-about transfer to straight-across transfer requires only the adjustment of the locking plate 113 and this may be made by conveniently swinging the transfer about the cam shaft as illustrated in FIG. 15. The timing of the opening and closing of the transfer fingers may be easily effected by adjusting the cams such as 71 and 72 relative to each other on the cam shaft 39.

The transfer assembly, indicated at 16 in FIG. 1, moves the cut off stock from the shear to the first die station 1 and ordinarily such transfer would require no turning of the blank end for end; nor would such a transfer require a timed opening and closing of the transfer fingers. The fingers 10 and 11, illustrated in connection with assembly 16, may be spring-biased toward each other.

The transfer apparatus described in connection with FIGS. 1 to 15 is also useful in connection with vertical presses. Such presses are characterized by an upright frame having four spaced posts such as, for example, the press shown and described in the patent to Clouse, No. 2,017,748. Such presses include a horizontally disposed die breast or die box at the lower end of the frame and a ram or header slide is mounted to reciprocate vertically with respect to the die breast.

In FIG. 16 the die breast of the press is indicated at 200 and the four upright frame members are indicated at 201, 202, 203 and 204. Each of the frame members is preferably provided with a tie rod such as 205 whereby the frame members may be preloaded by drawing up the tie bars and thus minimize the stretch of the frame in response to the load applied by the ram.

The press transfer, indicated in its entirety as at 210, is mounted at the front of the machine on frame members 201 and 202. The frame member 202 is provided with vertically spaced brackets 211 and 212. Each bracket is apertured to provide a pivotal journal for a vertical shaft 213. The transfer housing 214 is provided with an integrally formed bracket 215 which is secured to the vertical shaft 213. The right-hand side (as viewed in FIGS. 16 and 19) of the transfer housing 214 is provided with a bracket 217 which is secured to a right-hand vertical shaft 218.

The right-hand frame post 201 is provided with a vertically disposed bracket 219 and spaced clamps 220 and 221 carried by the bracket 219 are arranged to overhang the vertical shaft 218 when the transfer 210 is in its operating position. The cap screws in the clamps 220 and 221 may be draw up to securely clamp the shaft 218 in firm engagement with the vertical frame member 201 of the press. When the clamps 220 and 221 are released, the entire transfer assembly may be swung away from its operating position about the vertical axis of shaft 213 as shown in FIG. 16 to the dotted line position indicated in phantom outline. When the transfer bar 231 is in its left-hand position, as shown in full lines in FIG. 16, the bar 231 will swing along the line indicated by arrow 225 and thus clear the post 201. With the transfer assembly 210 swung to its dotted line position extending outwardly and away from the press, service and replacement of the dies in the die breast 200 and service and adjustment of the transfer is facilitated.

The transfer housing 214 carries spaced pinion shafts 226 and 227. A pinion 228 carried in the housing by the shaft 226 is arranged to mesh with teeth on a reciprocating rack 229. A pinion 230 carried by pinion shaft 227 is similarly arranged to mesh with the reciprocating rack 229. The pinion shafts 226 and 227 extend laterally inward over the die breast so as to jointly support the oscillating transfer bar 231.

The inner end of the pinion shaft 226 has fixed thereto a link 232. A similarly proportioned link 233 is fixed to the inner end of the pinion shaft 227.

The lower side of the transfer bar 231 which is adjacent the die breast 200 is provided with depending ears as at 234 and 235 for supporting a pin 236 on which the link 233 is journalled. Depending ears 237 and 238 similarly support the pin 239 on which the right-hand link 232 is journalled.

Referring to FIG. 17, rotation of the pinion shafts 227 and 226 in the direction of the arrows indicated at 240 will oscillate the transfer bar 231 from the full line position shown to the dotted line position. Blanks being formed in the dies which are mounted in the die breast 200 are progressively transferred across the die breast by the transfer finger assemblies indicated at 241, 242 and 243. The construction and arrangement of the parts of the transfer finger assemblies 241–243 corresponds to the finger assemblies described in connection with the first embodiment shown in FIGS. 1 to 15.

The mechanism for opening and closing the transfer fingers in the form of the invention employed on the vertical press includes a series of rocker arms 265, 266 and 267 pivotally mounted within the transfer housing 210. The pivotal pin for the rocker arm 265 is indicated at 268 in FIGS. 18 and 19. One end of the rocker arm 265 projects through an opening 269 in the top wall of the transfer housing and the other end of the rocker arm 265 projects through an opening 270 in the bottom wall of the transfer housing.

As viewed in FIG. 18, the lower end of the rocker arm 265 is provided with a roller 271 arranged to bear against a cam 272 carried by the cam shaft 273. A spring-biased plunger 265a urges the roller 271 against the cam 272. The upper end of the rocker arm 265 projecting through the housing opening 269 carries an adjusting screw 275 arranged to bear against a rod 276 mounted for reciprocation in the boss 277 on the transfer housing. Cam 278 carried by the cam shaft 273 is operatively arranged with respect to rocking lever 266 and a similar cam 279 is arranged to operate the rocking lever 267. The press transfer shown includes three pairs of transfer fingers for use with four die stations. It will be understood that the invention is not limited with respect to the number of die stations and that the transfer components are selected to meet the design of machine being used.

The tubular boss 280 integrally formed with the transfer housing 210 is provided with a sleeve bearing 281 for the outer end of the oscillating shaft 227. Preferably antifriction bearings 281a are carried within the transfer housing 210 adjacent the pinion 230 for the inner end of shaft 227. The upper side of the boss 280, as viewed in FIG. 18, is provided with a bracket 282. The bracket 282 includes a portion 283 disposed in alignment with the shaft 276 and a pivot pin 284 carried by the extension 283 serves as a fulcrum for the transfer arm 285 when the transfer bar 231 is oscillated by the shafts 226 and 227. The transfer arm 285, as shown in FIG. 20, carries a rock lever 286 pivoted at 287. One end of the rock lever 286 is provided with a roller 288 adapted to bear against the end of the rod 276.

It will be understood that movement of the rod 276 in response to the cam 272 effects the opening and closing of the transfer fingers in a manner described in detail in connection with the first form of the invention. It will also be understood that the pin 284 which provides the fulcrum for the arm 285 is located midway between the die stations and that the cams may be adjusted to open and close the transfer fingers at any point during the travel of the blank from one die to the next.

The transfer assemblies, indicated in their entirety as at 290, may be adjusted by means of plate 291 so as to invert the blank as it is being transferred from one die station to the next. It will also be understood that the blanks may be transferred without inversion by adjusting the plate 291 substantially as described in connection with the first embodiment of the invention.

The driving apparatus for the rotary drive to the cam shaft 273 and the oscillating drive to the reciprocating rack 228 is effected as illustrated in FIGS. 21 and 22. The vertical post or frame member 202 of the press supports the drive bracket 300. Spaced journal supports 301 and 302 are integrally formed with the bracket 300. A drive shaft 303 is journalled in supports 301 and 302. The shaft 303 carries on its outer end a sprocket 304 and a chain 305 is arranged to be driven by a sprocket on the crankshaft (not shown) of the press.

A coupling 306 connects the end of the shaft 303 to the end of the transfer cam shaft 273. The coupling 306 includes universal joints 307 at one end and 308 at the other end to permit the bodily swinging movement of the transfer housing about the axis of the pivot 213.

A pair of cams 309 and 310 are secured to the shaft 303 intermediate the supporting members 301 and 302. A rocking fixture, indicated in its entirety as at 311, is pivotally mounted as at 312 on the bracket 300. One arm of the rocking fixture, as at 313, is provided with a roller 314 which follows the contour of cam 309. The other arm of the rocking fixture 311, indicated at 315, is provided with a roller 316 which follows the contour of cam 310. The two arms 314 and 315 of the rocking fixture 311 are connected to each other and constrained to rock as a unit about the pivot 314 by means of bolt 317 extending through lugs 318 and 319.

Rotation of the shaft 303 produces a rocking motion of the fixture 311 about the pivotal axis 312 and the rocking motion of the fixture 311 is transmitted to a bell crank 320. The bell crank 320 is pivotally mounted on a vertical pin 320a. One arm of the bell crank 320, as indicated at 321, is pivotally connected to the end of the transfer rack 229. The other arm of the bell crank 320, as at 322, is pivotally connected to the upper end of arm 315 of the rocker assembly 311. The connection between the bell crank arm 322 and the pivot pin 323 includes a universal joint 324 which accommodates the arcuate swinging of the upper end of the lever 315. When the press is set in motion the movement of the chain 305 drives the shaft 303 and the cam shaft 273 and reciprocating rack 229 are thus driven in timed relation to the movement of the ram of the press.

The operation of the press transfer of FIGS. 16 to 22 corresponds generally to the form of transfer first described. The press transfer bar 231 carrying the transfer assemblies 290 oscillates in an arcuate path above the die box 200. The blanks being worked may be turned end for end depending upon the adjustment of plate 291.

Although I have shown and described two forms of my invention in considerable detail, it will be appreciated by those skilled in the art that numerous modifications may be made therein without departing from the scope of the invention as defined in the following claims:

What is claimed is:

1. Transfer apparatus for a metal forming machine having a series of spaced die stations arranged along a die breast comprising a transfer bar mounted adjacent the die stations for bodily arcuate swinging movement, means to maintain said bar parallel to the die breast during such arcuate swinging movement, a transfer assembly housing mounted on said bar at each of said die stations, a yoke journalled in said housing, a pair of transfer fingers mounted on said yoke, means interconnecting said yoke and die breast to rotate the yoke in response to arcuate swinging movement of the transfer bar, a cam shaft mounted parallel to the die breast, separate finger opening cams mounted on said cam shaft for each pair of fingers, separate means interconnecting each of said cams and the associated transfer fingers operable substantially independent of movement of said fingers relative to said die breast to open and close the transfer fingers in response to cam shaft rotation wherein the timing of the operation of each pair of fingers is independently determined by the associated cam.

2. Transfer apparatus for a metal forming machine having a series of die stations arranged in a vertically disposed die breast comprising an elongated horizontal transfer bar mounted on parallel links above the die stations for bodily arcuate swinging movement, said bar being moved by said parallel links and maintained parallel to the die breast by said links during such arcuate swinging movement, a transfer assembly housing fixed on said bar above each of said die stations, a tubular member journalled in said housing, a yoke carried by said tubular member, a pair of transfer fingers mounted on said yoke, means interconnecting said tubular member and die breast to rotate the yoke in response to arcuate swinging movement of the transfer bar, a cam shaft, separate finger opening cams on said cam shaft for each of said pair of transfer fingers, separate means interconnecting each of said cams and the associated of said transfer fingers operable substantially independent of movement of said fingers with said transfer bar to open and close the transfer fingers in response to cam shaft rotation wherein the timing of the operation of each pair of fingers is independently determined by the associated cam.

3. A transfer for a metal forming machine having a bed frame with a vertically disposed die breast and spaced die stations in the die breast, a cam shaft mounted on said bed frame above said die breast, an elongated transfer housing pivotally mounted on said cam shaft for movement toward and away from said bed frame, a plurality of parallel pinion shafts carried in said transfer housing, a reciprocating rack in the housing engaging said pinion shafts to rotate the pinion shafts, a transfer bar carried by said transfer housing above the die stations, links connecting said pinion shafts and said transfer bar to swing the bar through an arc of 180° in response to 180° of rotation of said pinion shaft, movement of said transfer bar being in a plane normal to the axes of said pinion shafts, a plurality of pairs of transfer fingers mounted on said transfer bar and depending therefrom to be aligned with die stations in the die breast, a crank arm interconnecting the transfer housing and said pairs of fingers to rotate the fingers relative to the housing through 180° in response to the arcuate swinging movement of said transfer bar through 180°.

4. A transfer for metal forming machines having a bed frame with horizontally spaced die stations in a die breast, a cam shaft mounted parallel to said die breast, a transfer housing pivotally mounted on said bed frame, a plurality of parallel spaced pinion shafts journalled in said transfer housing, a reciprocating rack in the housing engaging a pinion on each of said pinion shafts to rotate the shafts, a transfer bar carried by said transfer housing above the die breast, parallel links connecting said pinion shafts and said transfer bar to swing the bar through an arcuate path in response to rotation of said pinion shafts, a plurality of transfer finger housings mounted on said transfer bar, a yoke rotatably mounted in each housing and extending therefrom to support fingers aligned with die stations in the die breast, a crank arm pivoted on said transfer housing and connected to said yoke to rotate the yoke in response to the arcuate swinging movement of said transfer bar through an angle relative to said transfer bar equal to the angle of arcuate movement of said transfer bar relative to said housing.

5. A transfer bar for a metal forming machine having a bed frame and spaced die stations in a vertically disposed die breast, a cam shaft mounted on the bed frame parallel to the die breast, a transfer housing between the cam shaft and the die breast having spaced integrally formed ears journalled on said cam shaft whereby the housing may be swung upwardly away from the die breast, said housing having a pair of spaced pinion shafts mounted therein, a pinion on each pinion shaft, a rack mounted in the housing for reciprocation to turn said pinions, a transfer bar carried by said housing, said transfer bar extending parallel to the die breast over said die stations, a link fixed to each of said pinion shafts at one end and journalled on said transfer bar at the other, said links having the same length and being moved in unison whereby said transfer bar is moved through an arc in response to corresponding movement of the pinion shaft, a series of spaced transfer fingers mounted on said transfer bar, said transfer fingers being in alignment with a die station at each end of the swinging movement of the transfer bar, and linkage means connected between said cam shaft and fingers operable to open said fingers in response to cam shaft rotation.

6. A transfer bar for a metal forming machine having a bed frame and spaced die stations in a die breast, a transfer housing, said housing having a pair of spaced pinion shafts having end portions journalled in the housing, a pinion on each shaft, a rack mounted in the housing for reciprocation in mesh with said pinions, a transfer bar mounted on said pinion shafts exteriorly of said housing, said transfer bar extending parallel to the die breast, each of said pinion shafts having a mid-portion exterior of the housing, a link fixed to each of said pinion shafts at the mid-portion thereof, one end of said link being journalled on said transfer bar whereby said transfer bar is moved through a circular arc in response to corresponding movement of the pinion shaft, a series of spaced transfer fingers mounted on said transfer bar, said transfer fingers being in alignment with a die station at each end of the swinging movement of the transfer bar, and a crank arm connected to each of said transfer fingers and pivoted on said housing at a point substantially midway between adjacent die stations operable to rotate said transfer fingers in response to movement of said transfer bar.

7. A transfer assembly for a metal forming machine comprising a tubular housing mounted to swing through an arcuate path from one die station to the next adjacent die station, a transfer tube journalled within said housing and having a first portion projecting from one end of the housing and a yoke extending from the other end of said housing, laterally spaced transfer fingers pivotally carried by said yoke, an arm fixed to the tube on the said first portion thereof, said arm extending from the tube a distance corresponding to half of the distance between the die stations, pivot means fixed relative to said dies engaging said arm at the end thereof to rotate the tube within the housing as the housing is carried through its arcuate path from one die station to the next, a finger operating rod mounted for reciprocation in said transfer tube, and a linkage having a joint substantially midway between adjacent die stations moving in timed relation to the housing transfer motion engaging said rod to open and close the transfer fingers.

8. A transfer assembly for a metal forming machine having a series of spaced die stations comprising an elongated horizontally disposed transfer bar mounted parallel to the die stations, spaced shafts mounted for rotation adjacent the transfer bar, a link extending from each shaft to support the bar for arcuate bodily swinging movement in response to shaft rotation, said links being equally proportioned to carry the bar laterally and in parallelism to the dies a distance corresponding to the distance between the die stations, a transfer assembly mounted on said bar at each of said die stations, said transfer assembly comprising a housing mounted on said bar, said housing having a transfer yoke journalled therein, said yoke having an axial bore extending therethrough, cooperating transfer fingers mounted on said yoke, a reciprocating rod in said axial bore, said transfer fingers being operatively connected to the rod to open and close the fingers in response to rod reciprocation, an arm connected between said yoke and a pivot fixed relative to said die stations turning the yoke on its axis in the housing as the transfer bar is moved through its arcuate motion, a first link carried by said arm engaging said rod, and a second link engaging said first link with a joint substantially midway between adjacent die stations operating to move said first link thereby reciprocating said rod.

9. A transfer for metal forming machines comprising a transfer bar for supporting a plurality of pairs of blank carrying transfer fingers, means to mount said bar for arcuate swinging movement, a transfer housing mounted on said bar, a bearing tube mounted within said housing, a yoke tube mounted within said bearing tube, a clamp mounted on said yoke tube at one end thereof immediately adjacent said bearing tube, a crank member journalled on said yoke tube adjacent said clamp, said crank member having a crank arm extending laterally therefrom for rotation about the yoke tube axis, a movable locking bar carried by said clamp and means to secure the locking bar to said crank member in a first position whereby the clamp and yoke tube are turned as a unit by the crank member, and means to secure the locking bar in a second position in engagement with said transfer housing whereby the yoke tube is restrained against rotation by the crank member.

10. A transfer for metal forming machines comprising a transfer bar for supporting a plurality of pairs of blank carrying transfer fingers, means to mount said bar for arcuate swinging movement, a transfer housing mounted on said bar, a bearing tube mounted within said housing, a yoke tube mounted for rotation within said bearing tube, said yoke tube having spaced finger pivots at one end thereof, a lock member fixed to said yoke tube at its other end adjacent said bearing tube, a crank member journalled on said yoke tube adjacent said lock member, said crank member having a reaction arm extending laterally therefrom for rotation about the yoke tube axis, a movable locking bar carried by the lock member, means to secure the locking bar in a first position on said crank member whereby the lock member and yoke tube are arranged to be turned as a unit, and means to secure the locking bar in a second position in engagement with said transfer housing whereby the yoke tube is restrained against rotation by the crank member.

11. A transfer assembly comprising a transfer bar arranged to be moved through an arcuate path from one die station to a next adjacent die station, a transfer housing mounted on said bar, said housing including a tubular section, a bearing tube mounted within said tubular section, a yoke tube mounted in said bearing tube, said yoke tube having a first portion extending beyond the bearing tube at one end thereof for supporting transfer fingers and a second portion extending beyond the bearing tube at the other end thereof, a crank member journalled on the said yoke tube for rotation about the yoke tube axis, said crank member having an integrally formed crank arm extending laterally therefrom a distance corresponding to the radius of the arcuate path of the transfer bar, a lock member fixed to the yoke tube between the end of said bearing tube and said crank member, selective locking means to lock the yoke tube to the crank member to rotate the yoke tube thereby when the transfer housing is carried through said arcuate path, or alternatively lock the yoke tube to the housing and prevent rotation of the yoke tube relative to the housing.

12. A transfer assembly comprising a transfer bar arranged to be moved through an arcuate path from one die station to a next adjacent die station, a transfer housing mounted on said bar, said housing including a tubular section, a bearing tube mounted within said tubular section, a yoke tube mounted in said bearing tube, said yoke tube having a first portion extending beyond one end of the bearing tube for supporting transfer fingers and a second portion extending beyond the bearing tube at the other end thereof, a drive member journalled on the said second portion of said yoke tube, means to turn the drive member as the transfer bar is moved through its arcuate path, a locking member fixed to the yoke tube between the end of said bearing tube and said drive member, locking means to selectively lock the yoke tube to the drive member to rotate the yoke tube or alternatively to release said locking means with respect to said drive member and engage said housing whereby said yoke tube is restrained against rotation within said housing.

13. A transfer for metal forming machines comprising a transfer bar extending across the die stations in which blanks are to be worked, means to swing said transfer bar through a semi-circular path wherein the diameter of the circle through each end of said path corresponds to the distance between the die stations, a transfer assembly mounted on said bar, said assembly comprising a housing having a tubular section, a yoke tube mounted within said tubular section, said yoke tube having a yoke extending beyond one end of the tubular section, cooperating transfer fingers mounted on said yoke, said yoke tube having a portion extending beyond the other end of the tubular section, a drive member mounted for rotation on said last-named portion of the yoke tube, locking means to selectively lock the yoke tube to said housing or to said drive member, a finger operating rod mounted for vertical reciprocation in said yoke tube, said rod extending between the transfer fingers, means operatively connecting the transfer fingers to one end of said rod, said rod extending beyond said drive means, means mounted on said crank arm adapted to engage the upper end of said rod and move the rod, said last-named means being moved in timed relation to the travel of the transfer bar to open or close the fingers during said travel.

14. A transfer for metal forming machines having a vertical die breast with a series of spaced die stations therein comprising a transfer bar extending horizontally above the die stations in which blanks are to be worked, means to swing said transfer bar through a semi-circular path wherein the diameter of the circle through each end of said path corresponds to the distance between the die stations, a transfer assembly mounted on said bar, said assembly comprising a housing having a vertically disposed section, a yoke tube mounted within said section, said yoke tube having a lower portion extending beneath the bar, cooperating transfer fingers mounted on said lower portion of the yoke tube, said yoke tube having a portion extending upwardly above the transfer bar, a crank arm member mounted on said upwardly extending portion of the yoke tube, locking means to selectively lock the yoke tube to said housing or to said crank arm member, a finger operating rod mounted in said yoke tube, means operatively connecting the transfer fingers to the lower end of said rod, means mounted on said crank arm adapted to engage the upper end of said rod, said last-named means being moved in timed relation to the travel of the transfer bar through said semi-circular path to open or close the fingers during said travel.

15. Transfer apparatus for a press having a horizontally disposed die breast and a series of spaced dies therein, said press having spaced vertically disposed frame members extending upwardly from said die breast, a transfer for moving blanks to be worked in said dies from one die station to the next adjacent die station comprising a transfer housing supported between two adjacent vertical frame members, said transfer housing having a plurality of horizontally disposed oscillating shafts projecting inwardly therefrom over the die breast, a transfer bar operatively connected to said shafts for movement in an arcuate path, a plurality of tubular housings mounted on said transfer bar, a yoke journalled within each of said tubular housings, transfer fingers pivotally mounted on said yoke and extending therefrom into alignment with one of said die stations at each end of said arcuate path, an arm pivoted on said transfer housing and connected to rotate said yoke within the tubular housing as said transfer bar is moved through said arcuate path and linkage means including a first link carried by said arm engaging a second link on said transfer housing operable to open and close said transfer fingers.

16. Transfer apparatus for a press having a horizontally disposed die breast and a series of spaced dies therein, said press having spaced vertically disposed frame members extending upwardly from said die breast, a transfer for moving blanks to be worked in said dies from one die station to the next adjacent die station comprising an elongated transfer housing, means pivotally mounting one end of said housing on a vertical axis on one of said vertical frame members, means to clamp the other end of said housing on the next adjacent vertical frame member, said transfer housing having a plurality of horizontally disposed oscillating shafts projecting inwardly therefrom between said frame members and over the die breast, a transfer bar, means operatively connected to said shafts and transfer bar for moving the bar in an arcuate path, a plurality of tubular housings mounted on said transfer bar, a yoke journalled within each of said tubular housings, transfer fingers pivotally mounted on said yoke and extending therefrom to hold a blank in alignment with one of said die stations at each end of said arcuate path, an arm operatively connected between said transfer bar and transfer housing to rotate said yoke as said transfer bar is moved through said arcuate path, selective means connecting said yoke against rotation relative to said arm when in one position and against rotation relative to said transfer bar when in another position, a cam shaft mounted for rotation in said transfer housing, a rack mounted for reciprocation in said transfer housing and drive means to rotate the cam shaft and reciprocate said rack.

17. A transfer apparatus for a metal forming machine having a series of spaced die stations arranged along a die breast comprising a transfer bar, spaced pivots mounting said transfer bar adjacent said die stations for bodily arcuate swinging movement while maintaining said bar parallel to said die breast, a transfer assembly housing mounted on said bar at each die station, a yoke journalled in said housing, a pair of transfer fingers mounted in said yoke, means fixed relative to said die breast connected to said yoke rotating said yoke in response to arcuate swinging movement of said transfer bar, a cam shaft mounted on said die breast, finger opening cams mounted on said cam shaft, and linkage means interconnecting said cams and transfer fingers including two abutting links engaging for relative pivotal movement on an axis substantially parallel to the axis of said spaced pivots and substantially midway between adjacent die stations, said linkage means being operable to open and close the transfer fingers in response to cam shaft rotation.

18. A transfer for metal forming machines having a die breast and spaced die stations in said die breast comprising a plurality of parallel pinion shafts fixed relative to said die stations, a transfer bar, crank arms on each pinion shaft pivoted to said transfer bar operating to move said transfer bar with arcuate swinging movement while maintaining said transfer bar parallel to said die stations, means to rotate said pinion shafts in unison, a plurality of pairs of transfer fingers journalled on said transfer bar and extending therefrom for alignment with said die stations, a crank arm connected to each pair of transfer fingers, and a pivot fixed substantially midway between adjacent die stations connected to each arm and rotating the associated finger in response to the arcuate swinging movement of said transfer bar, each pivot permitting limited sliding movement with respect to the associated arm in a direction aligned with such arm.

References Cited in the file of this patent
UNITED STATES PATENTS

| | | |
|---|---|---|
| 2,100,028 | Frayer | Nov. 23, 1937 |
| 2,272,758 | Wilcox et al. | Feb. 10, 1942 |
| 2,648,077 | Friedman | Aug. 11, 1953 |
| 2,825,075 | De Loe | Mar. 4, 1958 |
| 2,985,897 | Byam | May 30, 1961 |